P. C. RITCHIE.
Machines for Stiffening Netting for Bonnet-Frames, &c.
No. 135,730.  Patented Feb. 11, 1873.
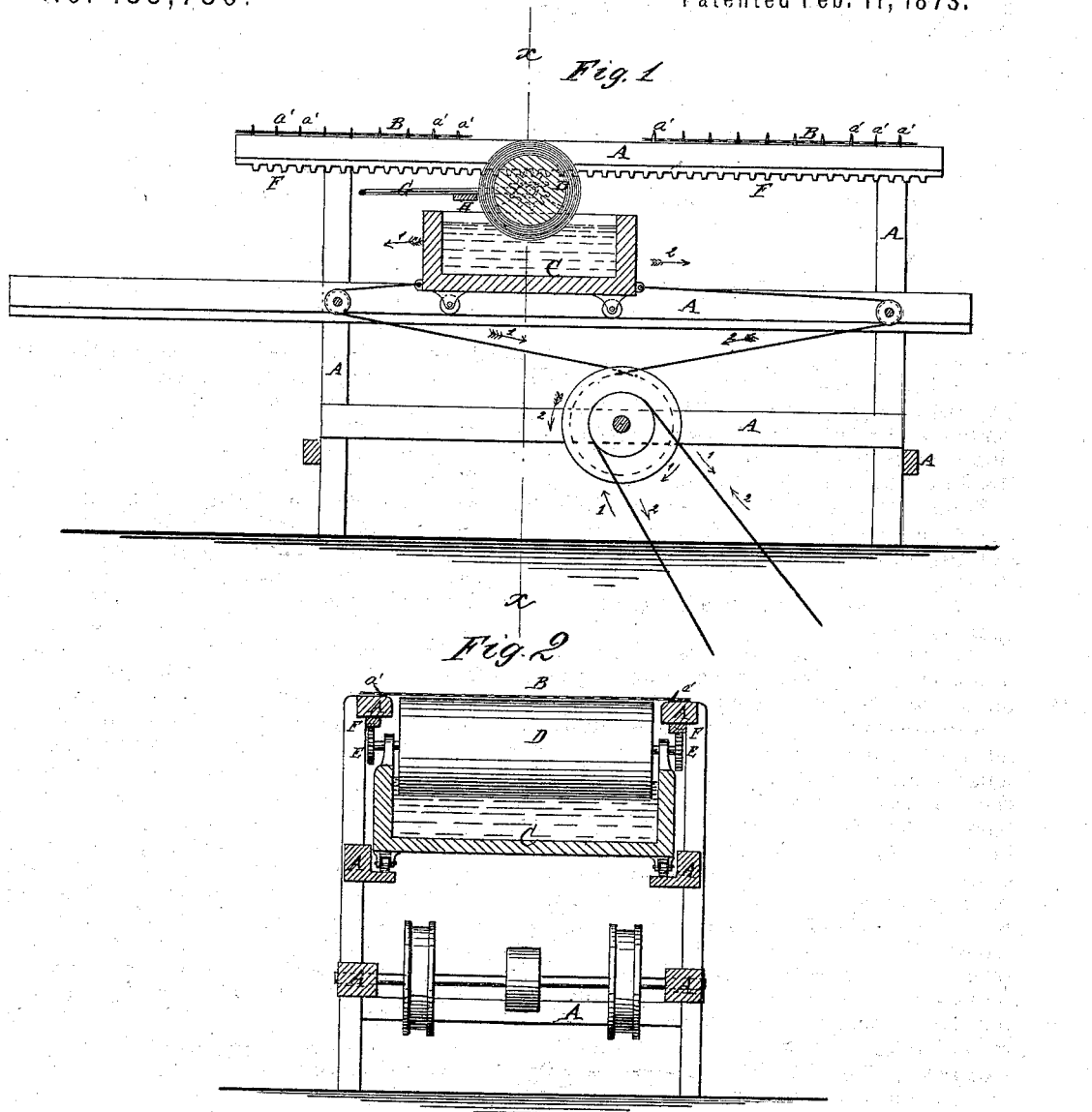
Witnesses:
A. W. Almquist
Sedgwick
Inventor:
P. C. Ritchie
Per Munn & Co.
Attorneys.

UNITED STATES PATENT OFFICE.

PETER C. RITCHIE, OF NEW YORK, N. Y.

IMPROVEMENT IN MACHINES FOR STIFFENING NETTING FOR BONNET-FRAMES, &c.

Specification forming part of Letters Patent No. 135,730, dated February 11, 1873.

*To all whom it may concern:*

Be it known that I, PETER C. RITCHIE, of the city, county, and State of New York, have invented a new and useful Improvement in Machine for Stiffening Mosquito-Net, of which the following is a specification:

Figure 1 is a detail vertical longitudinal section of my improved machine. Fig. 2 is a detail cross-section of the same taken through the line *x x*, Fig. 1.

Similar letters of reference indicate corresponding parts.

The invention consists in the improvement of machines for stiffening mosquito-netting, as hereinafter fully described.

A represents the frame-work of my improved machine, which may be made of any desired length, and of a width equal to the breadth of the material to be operated upon. The top bars of the frame A are provided with small hooks *a'*, upon which the edges of the mosquito-net or foundation B are hooked, as shown in Figs. 1 and 2. C is a box or trough, in which the stiffening-mixture is placed, and which slides back and forth in ways in the frame A, the friction being relieved by small wheels or rollers. D is a shaft or roller, the journals of which revolve in bearings attached to the middle part of the ends of the box or trough C. The roller D is covered with several thicknesses of a coarse cloth which takes up the stiffening-mixture from the box or trough C and transfers it to the mosquito-net or foundation B as the said box C is drawn back and forth beneath it. To the journals of the roller D are attached gear-wheels E, the teeth of which mesh into the rack-teeth F attached to the top rails of the frame A, so that the roller D may be revolved to apply the stiffening-mixture to the mosquito-net or foundation by the movement of the box or trough C. To the journals of the roller D are pivoted the ends of a bail, G, to the arms of which is attached a bar or scraper, H, in such a position as to remove the surplus stiffening-mixture that may be raised by the roller D, and thus prevent more than the proper amount of said mixture from being applied to the mosquito-net or foundation. As the direction of the box or trough C is changed the scraper G H must be shifted so as to always be upon the side of the roller D that is moving upward. The box or trough C may be moved back and forth by ropes or chains attached to the box or trough, and which pass around guide-pulleys and around a shaft or drum, to which motion may be given by a crank or any convenient power.

If desired, the box or trough may be moved back and forth by a swiveled screw. The stiffening-mixture may be evened, the surplus removed, and the meshes of the net or foundation kept open by means of a brush and sponge.

Having thus described my invention, I claim as new and desire to secure by Letters Patent—

The net-frame A having rack F on the lower side, the cloth-covered roller D provided with the pinions E E on its journals, and the movable trough C having bearings to receive said journals, all arranged and applied together, as and for the purpose described.

PETER C. RITCHIE.

Witnesses:
  JAMES T. GRAHAM,
  C. SEDGWICK.